US00RE45711E

(19) United States
(12) Reissued Patent
Beverley

(10) Patent Number: US RE45,711 E
(45) Date of Reissued Patent: Oct. 6, 2015

(54) BOTTLE

(71) Applicant: Lodestar Anstalt, Vaduz (LI)

(72) Inventor: Raymond David Beverley, London (GB)

(73) Assignee: Lodestar Ansalt, Vaduz (LI)

(21) Appl. No.: 29/498,692

(22) Filed: Aug. 6, 2014

Related U.S. Patent Documents

Reissue of:
(64) Patent No.: Des. 698,258
Issued: Jan. 28, 2014
Appl. No.: 29/435,097
Filed: Oct. 19, 2012

(30) Foreign Application Priority Data

Apr. 20, 2012 (EM) ..... 002030551-0001
Apr. 20, 2012 (EM) ..... 002030551-0002

(51) LOC (10) Cl. ..... 09-01
(52) U.S. Cl.
USPC ..... D9/625; D9/651
(58) Field of Classification Search
USPC ..... D3/270–271.3; D9/600, 614, 624–628, D9/632, 651, 434; 206/457, 527; 215/400; 220/890; 229/116.1–116.2; D7/514–520, 613, 619.2, 623, 628; D11/53, 57
See application file for complete search history.

(56) References Cited

U.S. PATENT DOCUMENTS

| | | | | | |
|---|---|---|---|---|---|
| D73,233 | S | * | 8/1927 | Lasater | D9/625 |
| D308,477 | S | * | 6/1990 | van den Ordel | D9/632 |
| D432,007 | S | * | 10/2000 | Strand et al. | D9/625 |
| D475,624 | S | * | 6/2003 | Cooper | D9/434 |

(Continued)

*Primary Examiner* — Phillip S Hyder
(74) *Attorney, Agent, or Firm* — Christie, Parker & Hale, LLP

(57) CLAIM

The ornamental design for bottle, as shown and described.

DESCRIPTION

FIG. 1 is a front perspective view of a first embodiment of a bottle according to the design;
FIG. 2 is a front view of the bottle of FIG. 1;
FIG. 3 is a rear view of the bottle of FIG. 1;
FIG. 4 is a right side view of the bottle of FIG. 1;
FIG. 5 is a left side view of the bottle of FIG. 1;
FIG. 6 is a top view of the bottle of FIG. 1;
FIG. 7 is a bottom view of the bottle of FIG. 1;
FIG. 8 is a front perspective view of a second embodiment of a bottle according to the design;
FIG. 9 is a front view of the bottle of FIG. 8;
FIG. 10 is a rear view of the bottle of FIG. 8;
FIG. 11 is a right side view of the bottle of FIG. 8;
FIG. 12 is a left side view of the bottle of FIG. 8;
FIG. 13 is a top view of the bottle of FIG. 8; and,
FIG. 14 is a bottom view of the bottle of FIG. 8.
*The broken lines depict portions of the bottle in which the design is embodied that are not considered part of the claimed design.*

1 Claim, 14 Drawing Sheets

Figure 1:
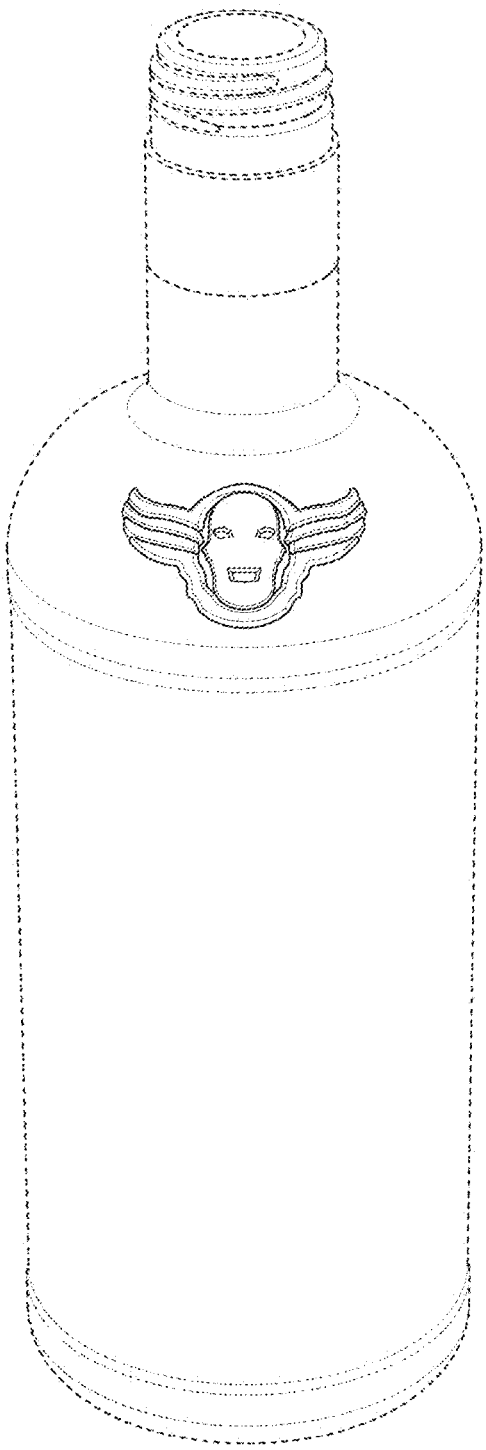
Figure 2:
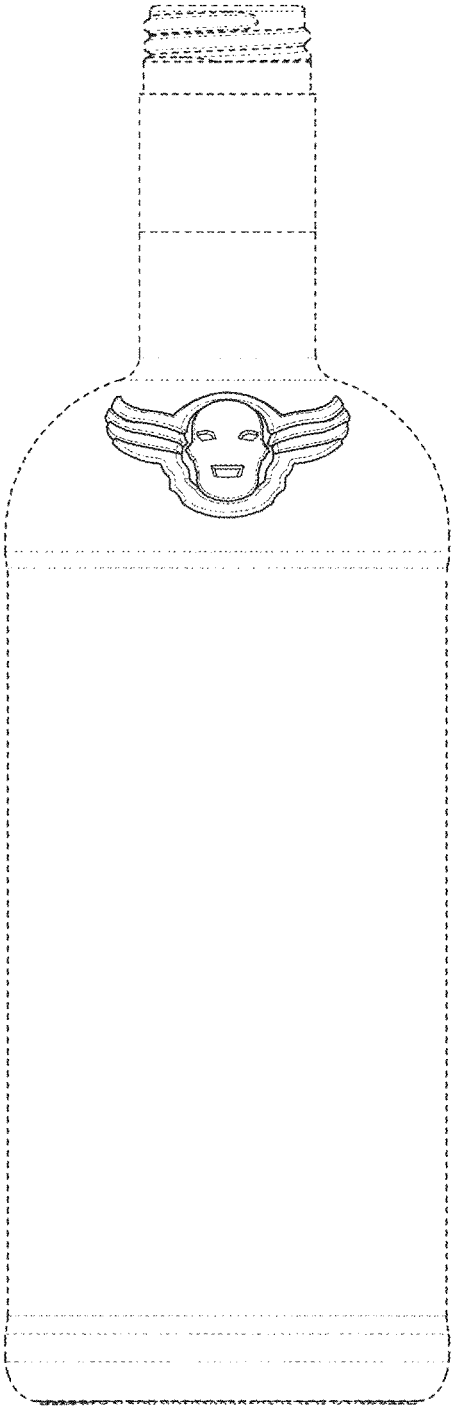
Figure 3:
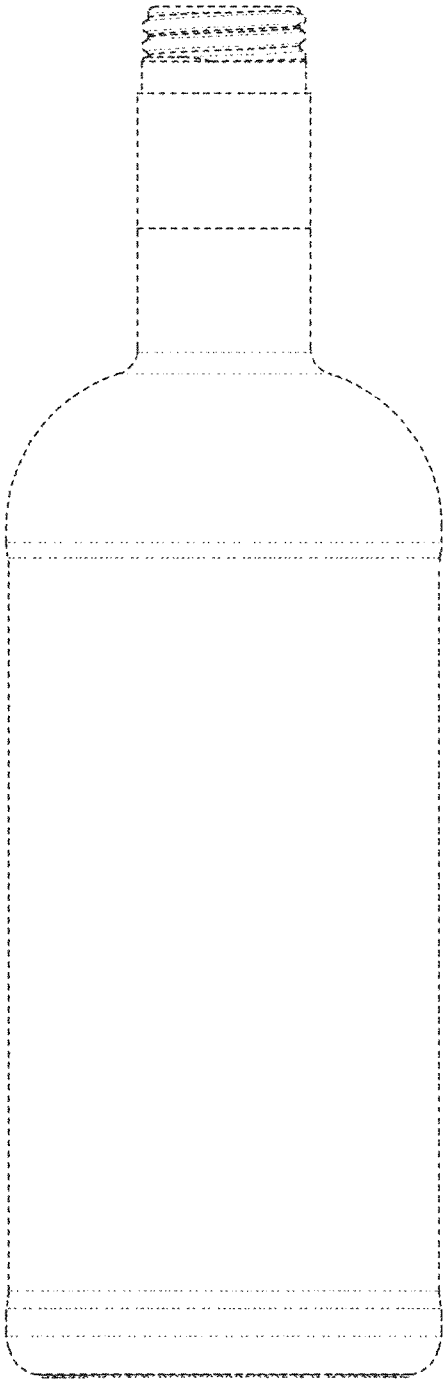
Figure 4:
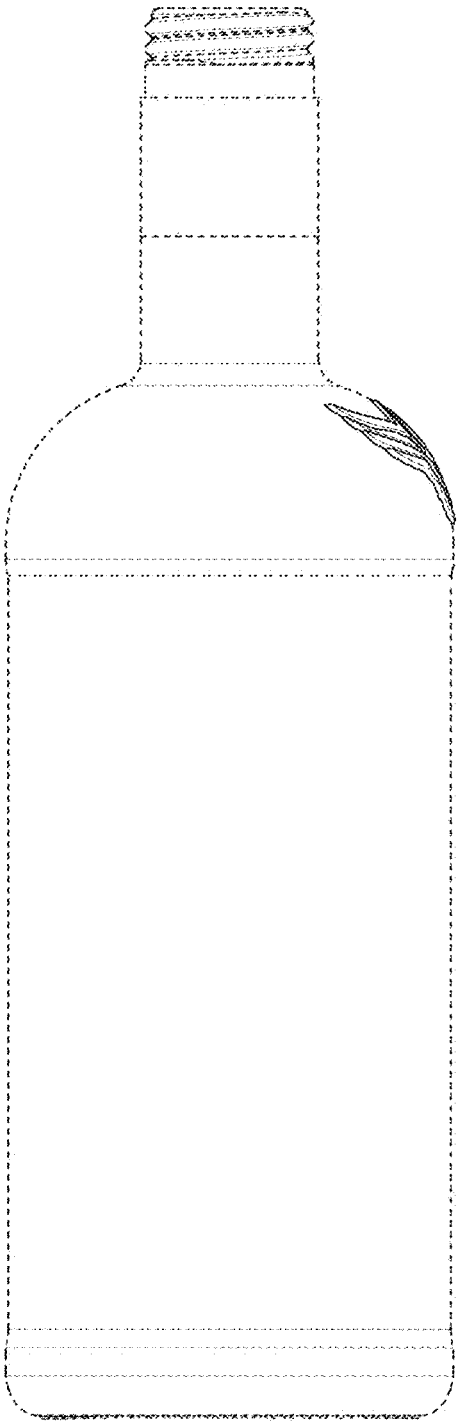
Figure 5:
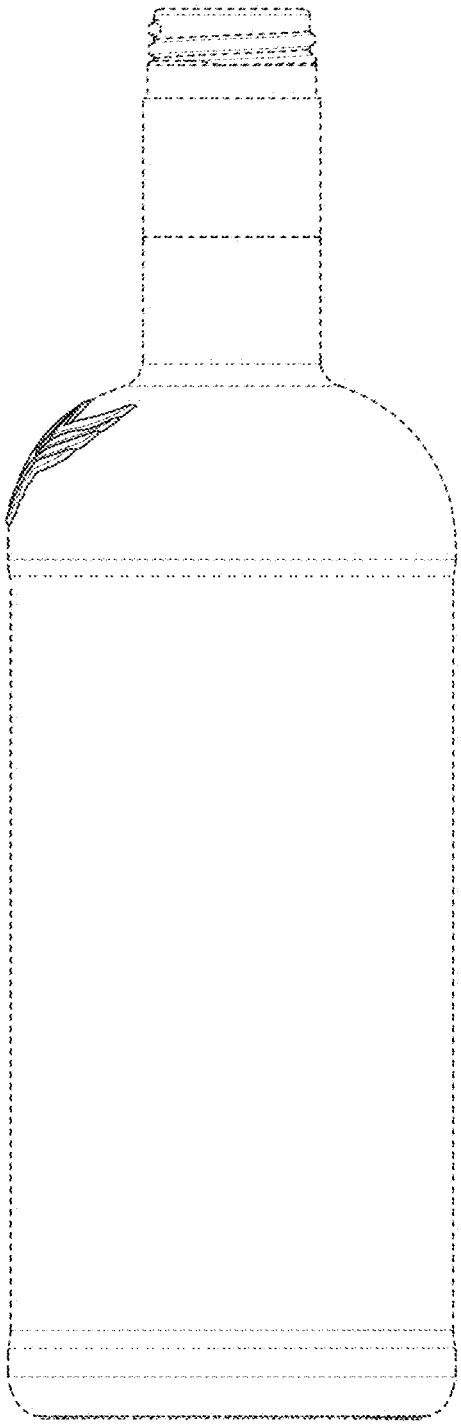
Figure 6:
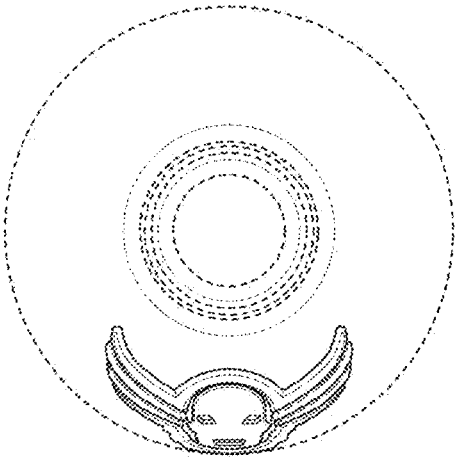
Figure 7:
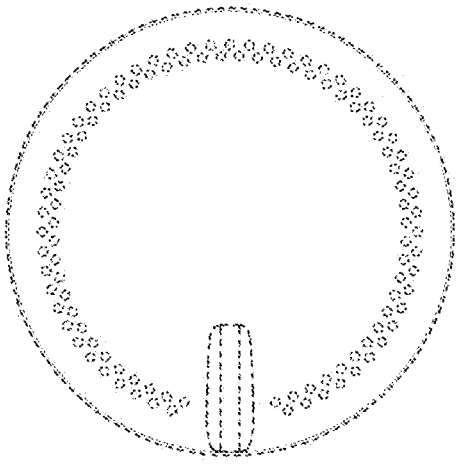
Figure 8:
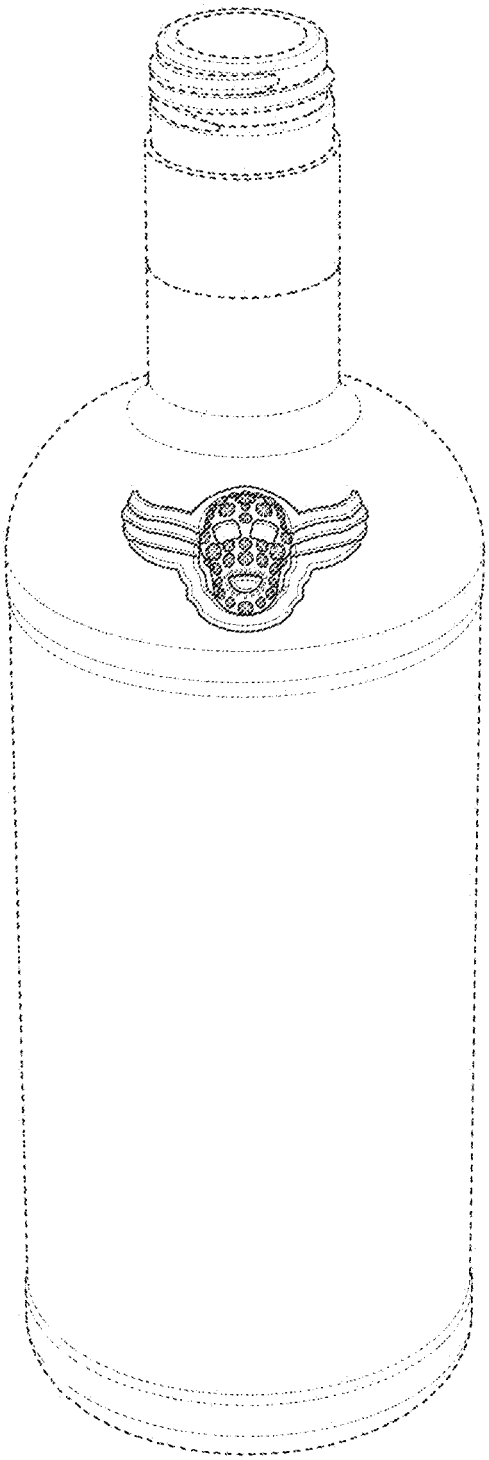
Figure 9:
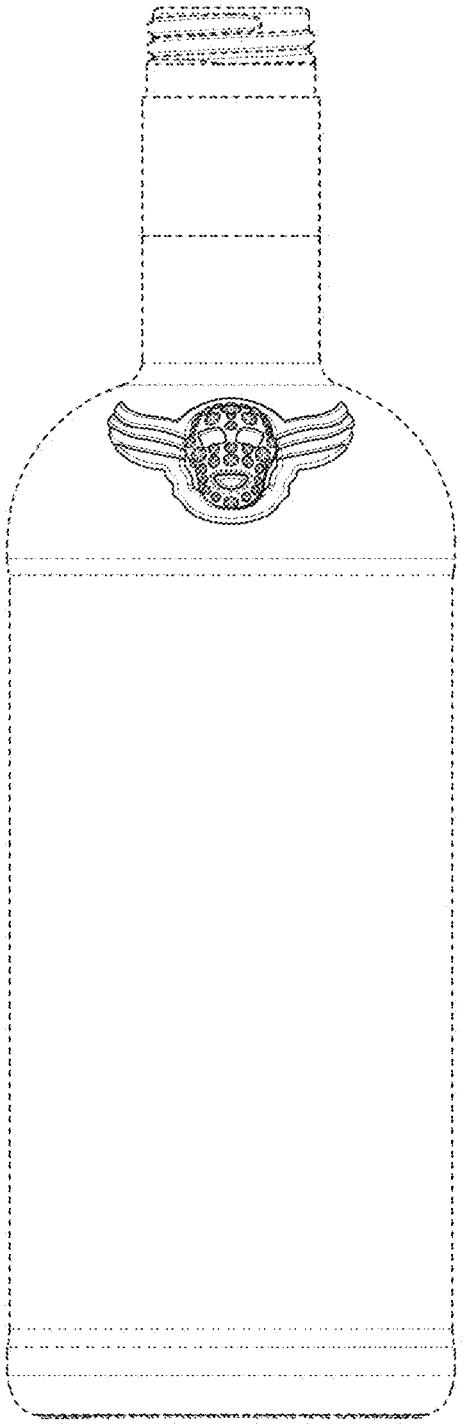
Figure 10:
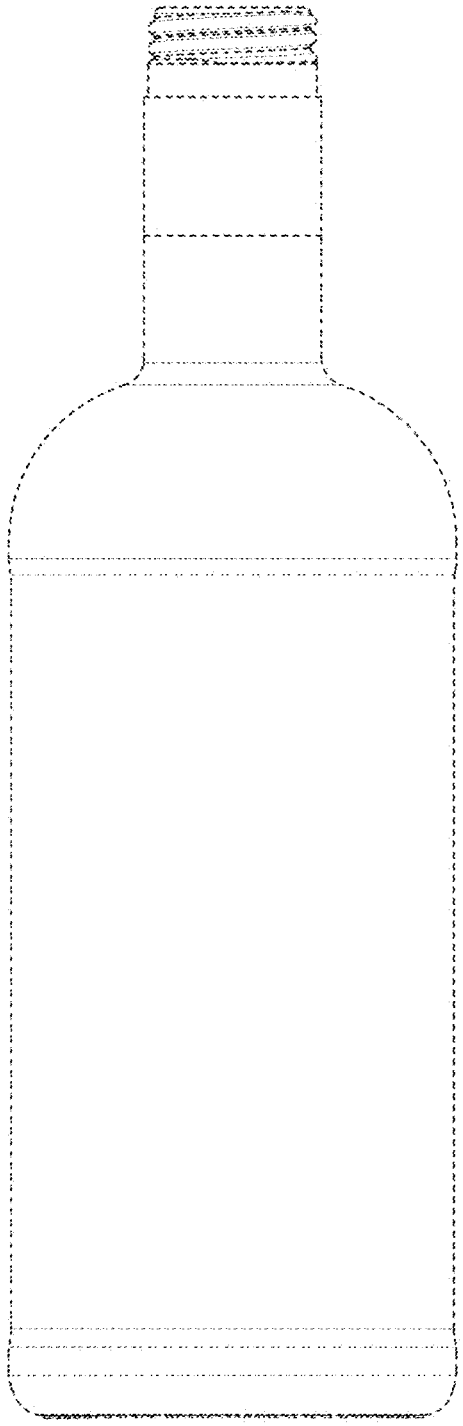
Figure 11:
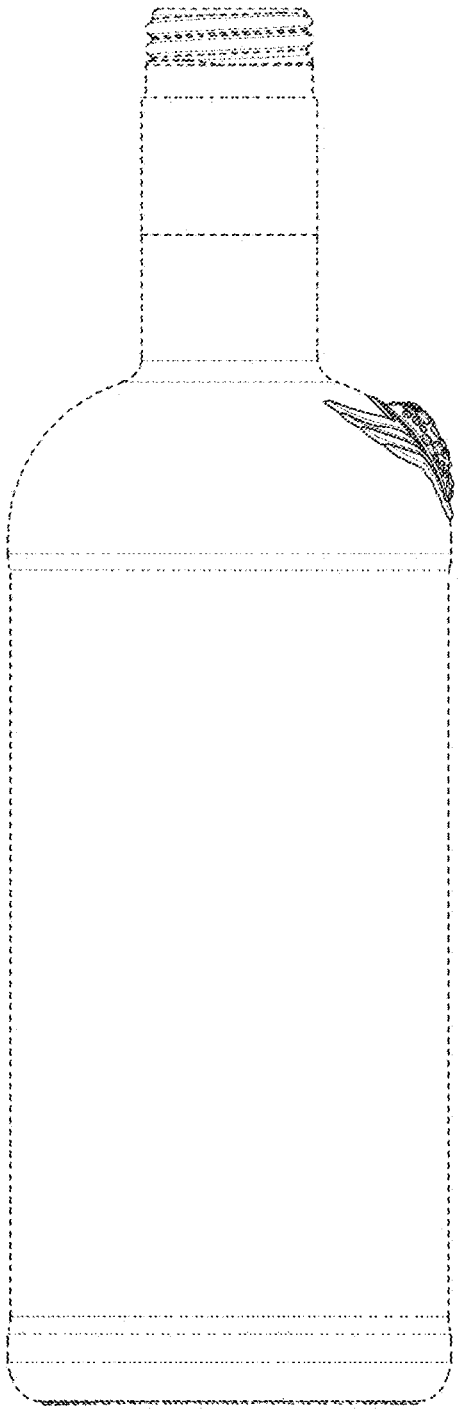
Figure 12:
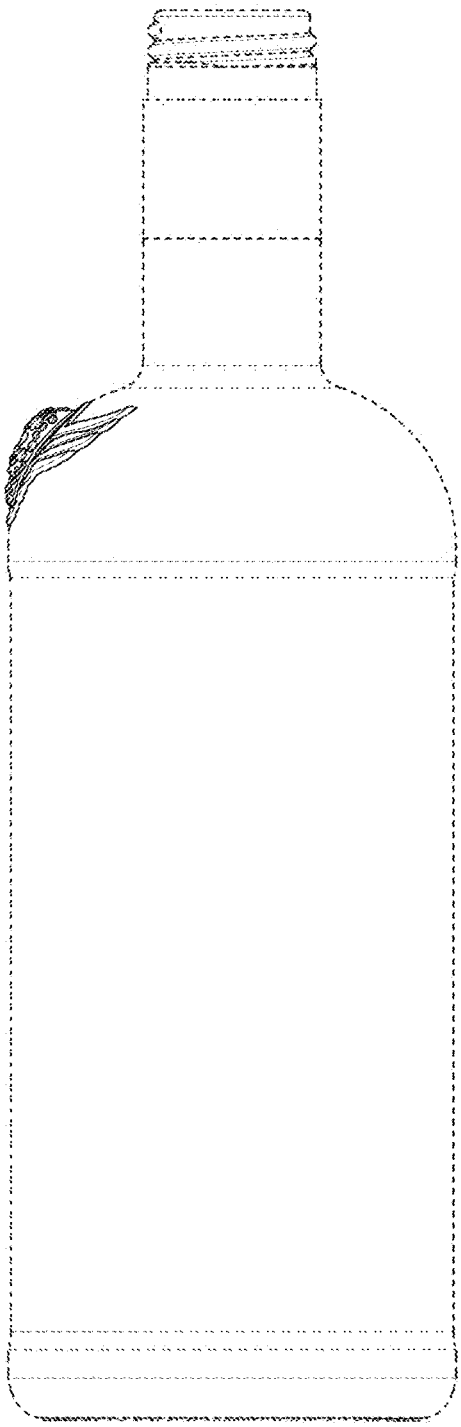
Figure 13:
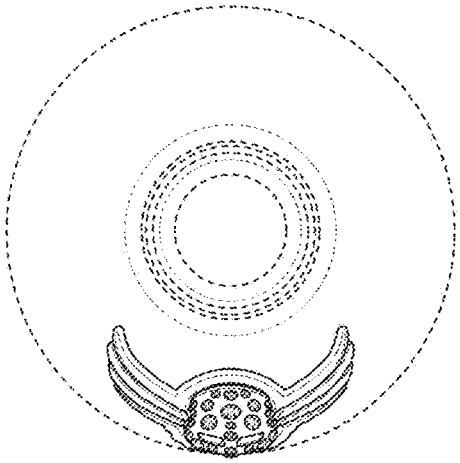
Figure 14:
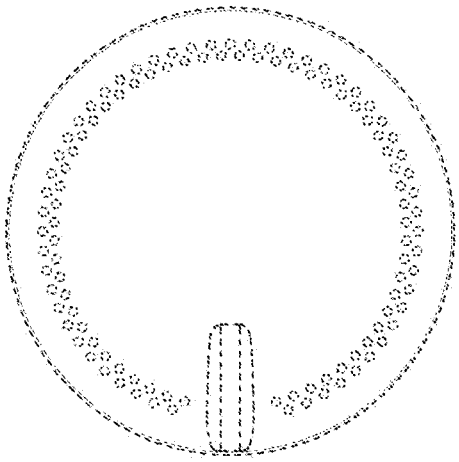

Matter enclosed in heavy brackets [ ] appears in the original patent but forms no part of this reissue; matter printed in italics indicates the additions made by reissue.

(56) References Cited

U.S. PATENT DOCUMENTS

D552,294 S * 10/2007 Lin ..... D26/139
D629,700 S * 12/2010 Hegnauer et al. ..... D9/651
D670,570 S * 11/2012 Matsushita ..... D9/651

* cited by examiner